(12) United States Patent  
Shibayama et al.

(10) Patent No.: US 9,625,314 B2  
(45) Date of Patent: *Apr. 18, 2017

(54) SPECTROMETER

(71) Applicant: HAMAMATSU PHOTONICS K.K., Hamamatsu-shi, Shizuoka (JP)

(72) Inventors: Katsumi Shibayama, Hamamatsu (JP); Takafumi Yokino, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/419,576

(22) PCT Filed: Jul. 29, 2013

(86) PCT No.: PCT/JP2013/070493  
§ 371 (c)(1),  
(2) Date: Feb. 4, 2015

(87) PCT Pub. No.: WO2014/024718  
PCT Pub. Date: Feb. 13, 2014

(65) Prior Publication Data  
US 2015/0241275 A1    Aug. 27, 2015

(30) Foreign Application Priority Data

Aug. 6, 2012 (JP) ................. 2012-174240

(51) Int. Cl.  
*G01J 3/28* (2006.01)  
*G01J 3/02* (2006.01)  
(Continued)

(52) U.S. Cl.  
CPC .............. *G01J 3/02* (2013.01); *G01J 3/0256* (2013.01); *G01J 3/0291* (2013.01); *G01J 3/04* (2013.01); *G01J 3/18* (2013.01); *G01J 3/28* (2013.01)

(58) Field of Classification Search  
CPC .......... G01J 3/18; G01J 3/0291; G01J 3/0264; G01J 3/0256  
See application file for complete search history.

(56) References Cited

U.S. PATENT DOCUMENTS

2002/0173181 A1* 11/2002 Matsumoto .......... H02G 3/0666  
439/98  
2004/0239931 A1   12/2004 Teichmann et al.  
(Continued)

FOREIGN PATENT DOCUMENTS

CN   101542251    9/2009  
CN   301144166    2/2010  
(Continued)

*Primary Examiner* — Kara E Geisel  
*Assistant Examiner* — Maurice Smith  
(74) *Attorney, Agent, or Firm* — Drinker Biddle & Reath LLP

(57) ABSTRACT

A spectrometer comprises a package having a stem and a cap, an optical unit arranged on the stem, and a lead pin penetrating through the stem. The optical unit has a dispersive part for dispersing and reflecting light entering from a light entrance part of the cap, a light detection element for detecting the light dispersed and reflected by the dispersive part, a support for supporting the light detection element such as to form a space between the dispersive part and the light detection element, a projection projecting from the support, and a wiring electrically connected to the light detection element. The projection is arranged at such a position as to be in contact with the stem. The lead pin is electrically connected to a second terminal part of the wiring arranged in the projection.

17 Claims, 8 Drawing Sheets

(51) Int. Cl.
*G01J 3/04* (2006.01)
*G01J 3/18* (2006.01)

(56) References Cited

U.S. PATENT DOCUMENTS

| | | | |
|---|---|---|---|
| 2010/0208258 A1* | 8/2010 | Shibayama | G01J 3/02 356/326 |
| 2011/0141469 A1 | 6/2011 | Shibayama | |
| 2011/0168135 A1* | 7/2011 | Powell | F02M 37/0011 123/509 |

FOREIGN PATENT DOCUMENTS

| | | |
|---|---|---|
| CN | 301197322 | 5/2010 |
| CN | 101970994 | 2/2011 |
| EP | 2 063 238 | 5/2009 |
| JP | H11-97657 A | 4/1999 |
| JP | 2000-298066 A | 10/2000 |
| JP | 2004-354176 | 12/2004 |
| JP | 1369923 | 9/2009 |
| TW | 200916742 A | 4/2009 |
| TW | 200938817 A | 9/2009 |
| TW | 201132945 | 10/2011 |
| WO | WO 00/40935 | 7/2000 |
| WO | WO 2008/149928 | 12/2008 |
| WO | WO-2008/149939 A1 | 12/2008 |
| WO | WO-2013/015008 A1 | 1/2013 |

\* cited by examiner

SPECTROMETER

TECHNICAL FIELD

The present invention relates to a spectrometer which disperses and detects light.

BACKGROUND ART

For example, Patent Literature 1 discloses a spectrometer comprising a light entrance part, a dispersive part for dispersing and reflecting light incident thereon from the light entrance part, a light detection element for detecting the light dispersed and reflected by the dispersive part, a box-shaped support for supporting the light entrance part, dispersive part, and light detection element, and a flexible printed board for electrically connecting the light detection element and an external wiring to each other.

CITATION LIST

Patent Literature

Patent Literature 1: Japanese Patent Application Laid-Open No. 2000-298066

SUMMARY OF INVENTION

Technical Problem

When an external force acts on the flexible printed board in the spectrometer mentioned above, electrical junctions between the light detection element and the flexible printed board may be damaged, or the package may warp, so that the positional relationship between the dispersive part and the light detection element may go wrong.

It is therefore an object of the present invention to provide a spectrometer which can secure the electrical connection between the light detection element and the external wiring and stabilize the positional relationship between the dispersive part and the light detection element at the same time.

Solution to Problem

The spectrometer in accordance with one aspect of the present invention comprises a package having a stem and a cap provided with a light entrance part; an optical unit arranged on the stem within the package, and a lead pin penetrating through the stem; the optical unit having a dispersive part for dispersing and reflecting light entering the package from the light entrance part, a light detection element for detecting the light dispersed and reflected by the dispersive part, a support for supporting the light detection element such as to form a space between the dispersive part and the light detection element, a projection projecting from the support, and a wiring including a first terminal part electrically connected to a terminal of the light detection element and a second terminal part arranged in the projection; the projection being arranged at such a position as to be in contact with the stem; the lead pin being electrically connected to the second terminal part.

In this spectrometer, the second terminal part of the wiring electrically connected to the light detection element is arranged in the projection projecting from the support supporting the light detection element, while an electrical connection between the lead pin and the wiring is achieved in this projection. This secures the electrical connection between the lead pin and the wiring. In addition, since the lead pin penetrates through the stem, any external force acting on the lead pin on the outside of the package is less likely to extend over the electrical junction between the lead pin and the wiring in the projection. Further, the projection projecting from the support supporting the light detection element is arranged at such a position as to be in contact with the stem. This enables the support to be seated well with respect to the stem, whereby the positional relationship between the dispersive part and the light detection element is harder to go wrong. The foregoing makes it possible for this spectrometer to secure the electrical connection between the light detection element and the external wiring and stabilize the positional relationship between the dispersive part and the light detection element at the same time.

In the spectrometer in accordance with one aspect of the present invention, the lead pin may electrically be connected to the second terminal part while being disposed in the projection. This configuration can position the optical unit with respect to the package in addition to electrically connecting the lead pin to the second terminal part.

In the spectrometer in accordance with one aspect of the present invention, the lead pin may electrically be connected to the second terminal part while being inserted through the projection. This configuration can achieve the electrical connection between the lead pin and the second terminal part and the positioning of the optical unit with respect to the package more securely and more easily.

In the spectrometer in accordance with one aspect of the present invention, the lead pin may electrically be connected to the second terminal part by wire bonding while being separated from the projection. This configuration can secure the electrical connection between the lead pin and the second terminal part by wire bonding, since the projection arranged with the second terminal part is placed at such a position as to be in contact with the stem.

The spectrometer in accordance with one aspect of the present invention may be configured such that a plurality of lead pins are provided, a plurality of projections are provided so as to correspond to the respective lead pins, and the lead pins are arranged so as to pass through the projections adjacent to each other. This configuration can utilize the space effectively, so as make the spectrometer smaller.

In the spectrometer in accordance with one aspect of the present invention, the support may be secured onto the stem. This configuration can further improve the stability of the support with respect to the stem in conjunction with the fact that the projection projecting from the support is arranged at such a position as to be in contact with the stem.

In the spectrometer in accordance with one aspect of the present invention, the support may be provided with the wiring. This configuration makes it possible to route the wiring appropriately.

In the spectrometer in accordance with one aspect of the present invention, the support may include a base wall part, arranged so as to oppose the stem, having the light detection element secured thereto, and a side wall part, arranged so as to erect from a side of the dispersive part to the stem, for supporting the base wall part, the projection projecting from the side wall part to the side opposite from the dispersive part. This configuration can simplify the structure of the support.

In the spectrometer in accordance with one aspect of the present invention, the base wall part may be provided with a light transmission part for transmitting therethrough the light entering the package from the light entrance part. This configuration can inhibit unnecessary light from entering the dispersive part.

In the spectrometer in accordance with one aspect of the present invention, the light detection element may be arranged on the stem side of the base wall part. This configuration can inhibit unnecessary light from entering the dispersive part.

In the spectrometer in accordance with one aspect of the present invention, the base wall part, side wall part, and projection may be formed integrally. This configuration can stabilize the positional relationship among the base wall part, side wall part, and projection.

In the spectrometer in accordance with one aspect of the present invention, the dispersive part may constitute a dispersive element by being provided on a substrate. This configuration can improve the degree of freedom in arranging the dispersive part within the package.

In the spectrometer in accordance with one aspect of the present invention, the dispersive element may be secured onto the stem. This configuration can control the temperature of the dispersive part by heat transfer through the stem.

In the spectrometer in accordance with one aspect of the present invention, the dispersive element may be supported by the support while being separated from the stem. This configuration can inhibit heat from affecting the dispersive part from the outside through the stem.

In the spectrometer in accordance with one aspect of the present invention, the support may be formed with a cutout for disposing a part of the dispersive element therein. This configuration makes it possible to position the dispersive part with respect to the light detection element through the support.

In the spectrometer in accordance with one aspect of the present invention, the optical unit may further have an opposing part opposing the projection on the side opposite from the stem. This configuration can improve the strength of the support and reduce stray light.

Advantageous Effects of Invention

The present invention can provide a spectrometer which can secure the electrical connection between the light detection element and the external wiring and stabilize the positional relationship between the dispersive part and the light detection element at the same time.

DESCRIPTION OF EMBODIMENTS

Figure 1:
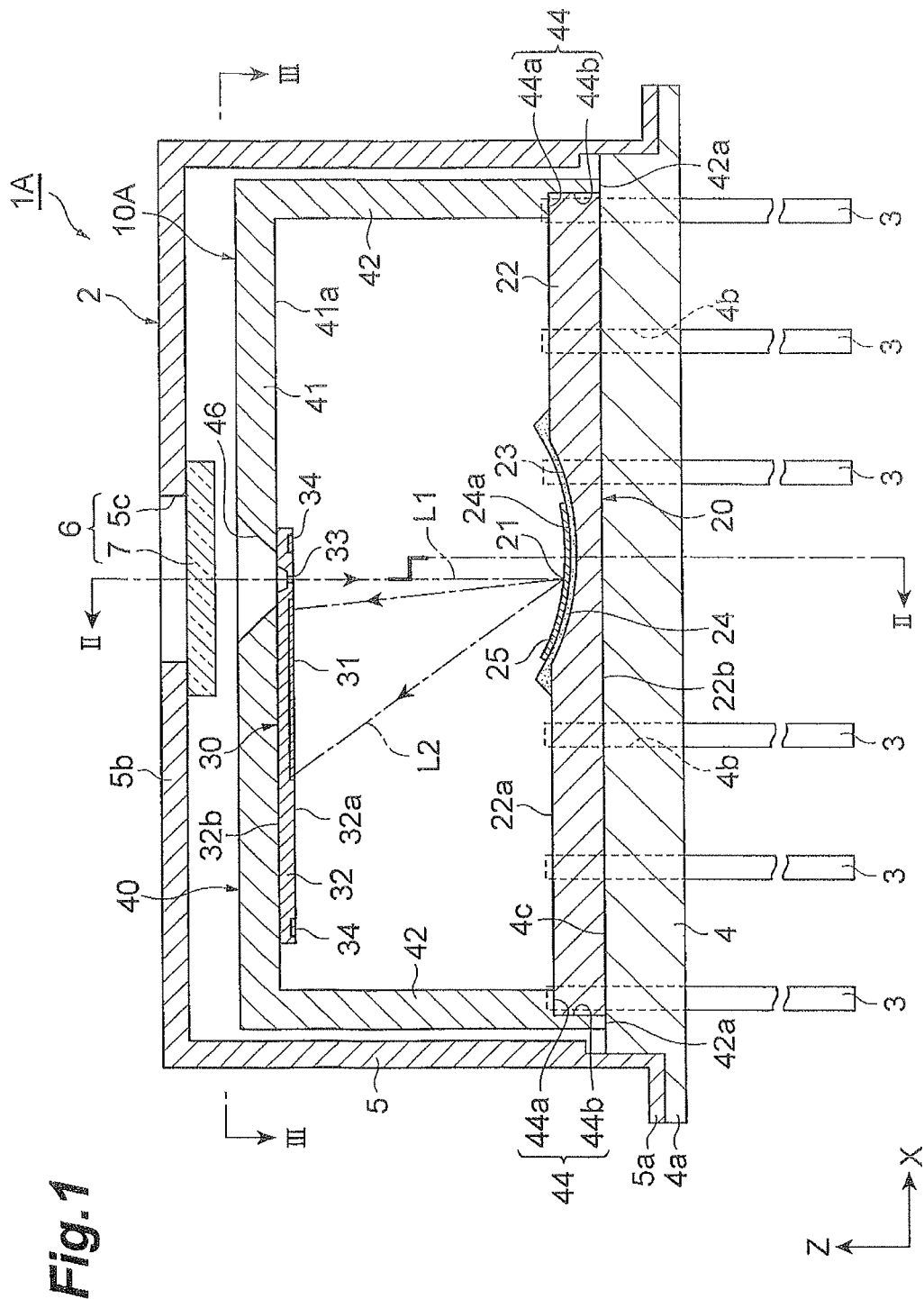
FIG. 1 is a sectional view of the spectrometer in accordance with a first embodiment of the present invention.

In the following, preferred embodiments of the present invention will be explained in detail with reference to the drawings. In the drawings, the same or equivalent parts will be referred to with the same signs while omitting their overlapping descriptions.

First Embodiment

Figure 2:
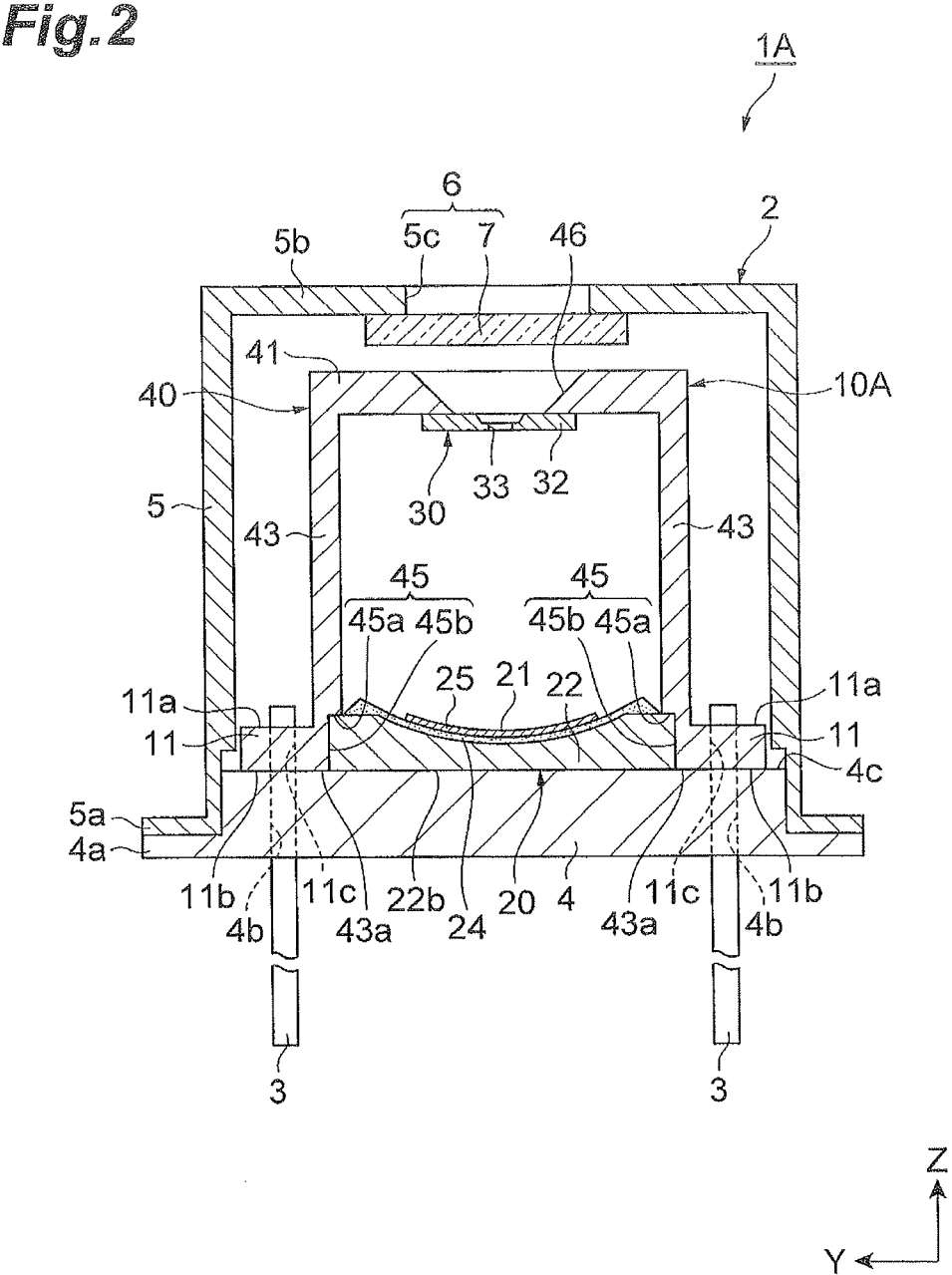
FIG. 2 is a sectional view taken along the line II-II of FIG. 1 and seen as a side view.

As illustrated in FIGS. 1 and 2, a spectrometer 1A comprises a package 2 having a structure of a CAN package, an optical unit 10A contained in the package 2, and a plurality of lead pins 3. The package 2 has a rectangular plate-like stem 4 made of a metal and a cap 5 shaped into a rectangular parallelepiped box made of a metal. The stem 4 and the cap 5 are joined to each other airtightly while a flange part 4a of the step 4 and a flange part 5a of the cap 5 are in contact with each other. By way of example, the stem 4 and the cap 5 are airtightly sealed to each other in a nitrogen atmosphere under dew point management (e.g., at −55° C.). This can prevent resin parts from deteriorating due to moisture and internal condensation from occurring when the outside air temperature drops, thereby yielding high reliability. One side of the package 2 has a length on the order of 10 to 20 mm, for example.

In the cap 5, a wall part 5b opposing the stem 4 is provided with a light entrance part 6 for letting light L1 into the package 2 from the outside thereof. The light entrance part 6 is constructed by airtightly joining a window member 7 having a disk or rectangular plate form to a light transmission hole 5c having a circular cross section formed in the wall part 5b. The window member 7 is made of a material which transmits the light L1 therethrough, examples of which include silica, borosilicate glass (BK7), Pyrex (registered trademark) glass, and Kovar. Silicon and germanium are also effective for infrared rays. The window member 7 may also be provided with an AR (Anti Reflection) coat. The window member 7 may further have such a filter function as to transmit therethrough only a predetermined wavelength of light. The window member 7 is bonded to the inner surface of the wall part 5b with a resin adhesive material, for example.

Each lead pin 3 penetrates through the stem 4 while being arranged in a through hole 4b of the stem 4. Each lead pin 3 is made of a metal constructed by applying nickel plating (1 to 10 μm) and gold plating (0.1 to 2 μm) and the like to Kovar metal, for example, and extends in the direction in which the light entrance part 6 and the stem 4 oppose each other (hereinafter referred to as "Z-axis direction"). Each lead pin 3 is secured to the through hole 4b through a hermetic seal made of low-melting glass having electrically-insulating and light-shielding properties. In each of a pair of side edge parts of the rectangular-plate-shaped stem 4 opposing each other in a direction (hereinafter referred to as "Y-axis direction") perpendicular to its longitudinal direction (hereinafter referred to as "X-axis direction") and Z-axis direction, a plurality of through holes 4b are arranged in a row along the X-axis direction.

The optical unit 10A is arranged on the stem 4 within the package 2. The optical unit 10A has a dispersive element 20, a light detection element 30, and a support 40. The dispersive element 20 is provided with a dispersive part 21, which disperses and reflects the light L1 entering the package 2 from the light entrance part 6. The light detection element 30 detects light L2 dispersed and reflected by the dispersive part 21. The support 40 supports the light detection element 30 so as to form a space between the dispersive part 21 and the light detection element 30.

The dispersive element 20 has a substrate 22 having a rectangular plate form made of silicon, plastic, ceramic, glass, or the like. In the substrate 22, a surface 22a on the light entrance part 6 side is formed with a depression 23 having a curved inner surface. A molded layer 24 is arranged on the surface 22a of the substrate 22 so as to cover the depression 23. The molded layer 24 is formed into a film along the inner surface of the depression 23 and has a circular form when seen in the Z-axis direction.

A grating pattern 24a corresponding to a blazed grating having a serrated cross section, a binary grating having a rectangular cross section, a holographic grating having a sinusoidal cross section, or the like is formed in a predetermined region of the molded layer 24. The grating pattern 24a is constructed by a plurality of grating grooves, each extending in the Y-axis direction when seen in the Z-axis direction. This molded layer 24 is formed by pressing a mold die against a molding material (e.g., photocuring epoxy resins, acrylic resins, fluorine-based resins, silicone, and replica optical resins such as organic/inorganic hybrid resins) and curing the molding material (by photocuring or thermal curing) in this state.

A reflecting film 25, which is a vapor-deposited film made of Al, Au, or the like, is formed on a surface of the molded layer 24 so as to cover the grating pattern 24a. The reflecting film 25 is formed along the shape of the grating pattern 24a, and this part serves as the dispersive part 21 in the form of a reflection grating. As in the foregoing, the dispersive part 21 is provided on the substrate 22, so as to construct the dispersive element 20.

The light detection element 30 has a substrate 32 having a rectangular plate form made of a semiconductor material such as silicon. The substrate 32 is formed with a slit 33 extending in the Y-axis direction. The slit 33 is located between the light entrance part 6 and the dispersive part 21 and transmits therethrough the light L1 entering the package 2 from the light entrance part 6. In the slit 33, an end part on the light entrance part 6 side widens toward the light entrance part 6 in each of the X- and Y-axis directions.

In the substrate 32, a surface 32a on the dispersive part 21 side is provided with a light detection part 31 in juxtaposition with the slit 33 along the X-axis direction. The light detection part 31 is constructed as a photodiode array, a C-MOS image sensor, a CCD image sensor, or the like. The surface 32a of the substrate 32 is provided with a plurality of terminals 34 for inputting/outputting electric signals to/from the light detection part 31. For detecting infrared rays, a thermal infrared detection part such as a thermopile array or a bolometer array or a photodiode array made of InGaAs or the like may be used as the light detection part 31.

The support 40 is a hollow structure including a base wall part arranged so as to oppose the stem 4 in the Z-axis direction, a pair of side wall parts 42 arranged so as to oppose each other in the X-axis direction, and a pair of side wall parts 43 arranged so as to oppose each other in the Y-axis direction. The side wall parts 42, 43, each of which erects from a side of the dispersive part 21 to the stem 4, support the base wall part 41 while surrounding the dispersive part 21.

The light detection element 30 is secured to the base wall part 41. The light detection element 30 is secured to the base wall part 41 by bonding a surface 32b of the substrate 32 on the side opposite from the dispersive part 21 to an inner surface 41a of the base wall part 41. That is, the light detection element 30 is arranged on the stem 4 side of the base wall part 41.

The base wall part 41 is formed with a light transmission hole (light transmission part) 46 for communicating the inside and outside spaces of the support 40 in the form of a hollow structure to each other. The light transmission hole 46 is located between the light entrance part 6 and the slit 33 of the substrate 32 and transmits therethrough the light L1 entering the package 2 from the light entrance part 6. The light transmission hole 46 widens toward the light entrance part 6 in each of the X- and Y-axis directions. When seen in the Z-axis direction, the light transmission hole 5c of the light entrance part 6 includes the light transmission hole 46 as a whole, while the light transmission hole 46 includes the slit 33 as a whole.

In each side wall part 42, an end part on the stem 4 side is formed with a cutout 44 having a bottom face 44a and a side face 44b. In each side wall part 43, an end part on the stem 4 side is formed with a cutout 45 having a bottom face 45a and a side face 45b. The bottom face 44a of the cutout 44 and the bottom face 45a of the cutout 45 are continuous with each other along an opening defined by the side wall parts 42, 43. Similarly, the side face 44b of the cutout 44 and the side face 45b of the cutout 45 are continuous with each other along the opening. An outer edge part of the substrate 22 of the dispersive element 20 disposes into these continuous cutouts 44, 45.

Figure 3:
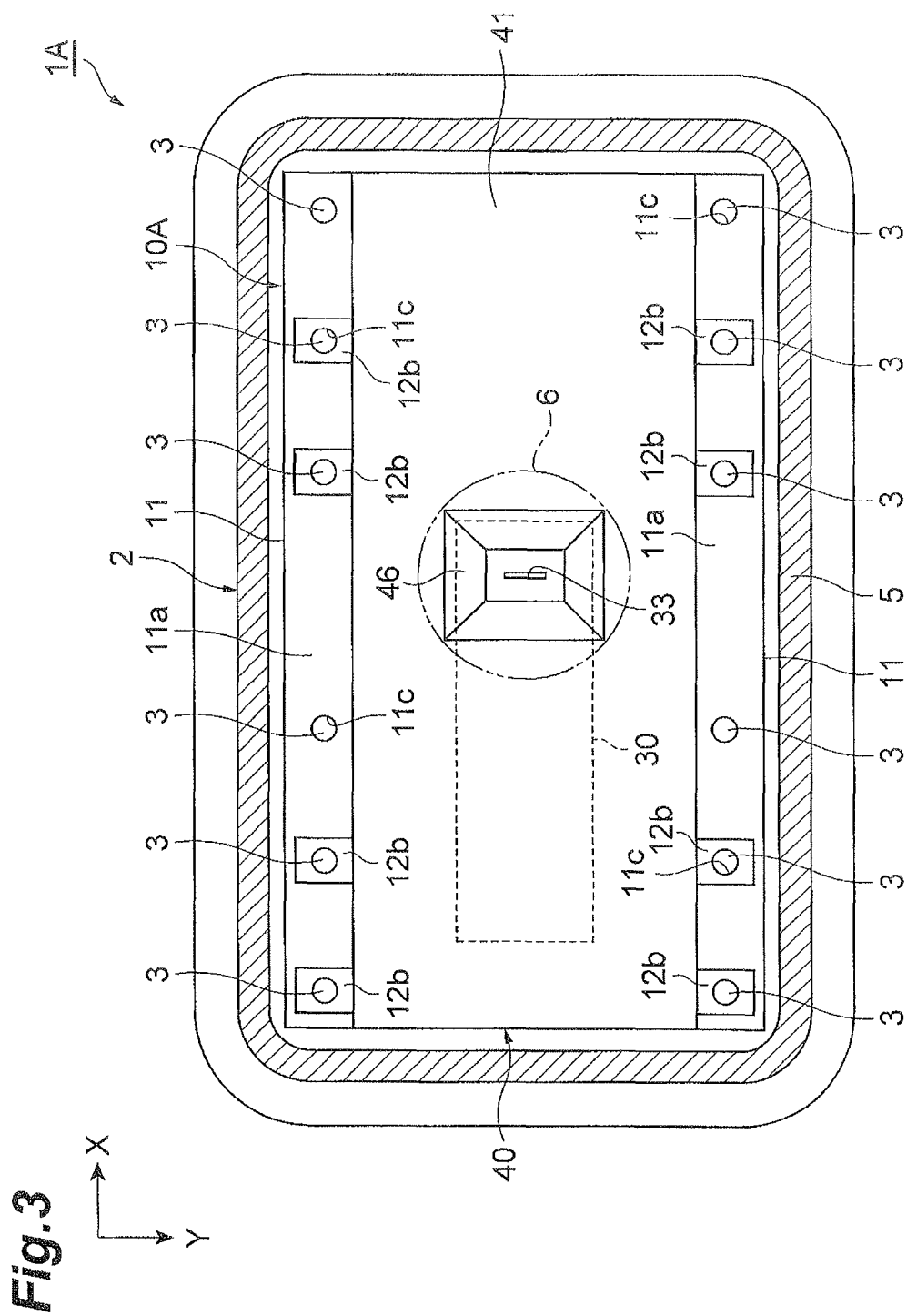
FIG. 3 is a sectional view taken along the line III-III of FIG. 1 and seen as a plan view.

As illustrated in FIGS. 2 and 3, the optical unit 10A further comprises projections 11 projecting from the support 40. Each projection 11 is arranged at such a position as to be in contact with the stem 4. The projection 11 projects from an end part on the stem 4 side of each side wall part 43 to the side opposite from the dispersive part 21 (i.e., the outside of the support 40 in the form of a hollow structure) and extends in the X-axis direction along the end part of each side wall part 43.

In the optical unit 10A, as illustrated in FIGS. 1 and 2, a surface 22b on the stem 4 side of the dispersive element 20, end faces 42a on the stem 4 side of the side wall parts 42, end faces 43a on the stem 4 side of the side wall parts 43, and surfaces lib on the stem 4 side of the projections 11 are substantially flush with each other. In this state, the surface 22b of the substrate 22, the end faces 42a of the side wall parts 42, the end faces 43a of the side wall parts 43, and the surfaces 11b of the projections 11 are bonded to an inner surface 4c of the stem 4, whereby the dispersive element 20 and support 40 are secured onto the stem 4.

Figure 4:
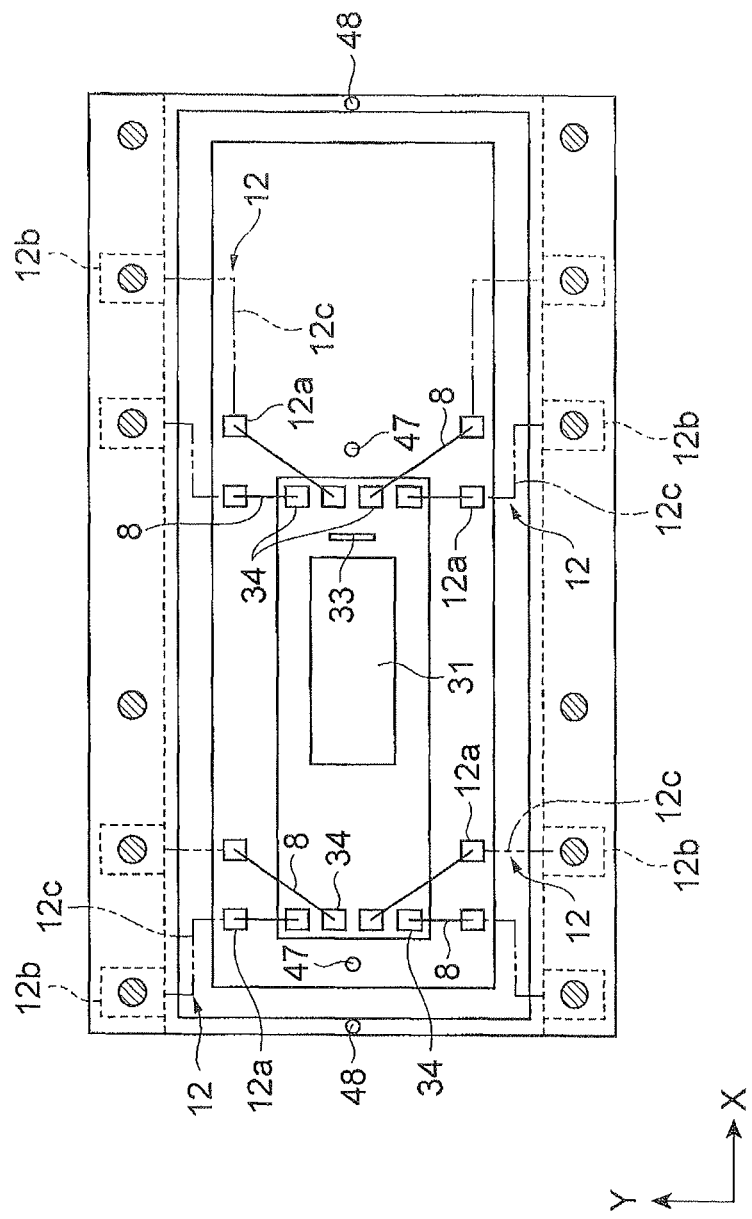
FIG. 4 is a bottom view of a support in the spectrometer of FIG. 1.

As illustrated in FIG. 4, the optical unit 10A further comprises wiring 12 provided in the support 40. The wiring 12 includes a plurality of first terminal parts 12a, a plurality of second terminal parts 12b, and a plurality of connection parts 12c. The first terminal parts 12a are arranged on the inner surface 41a of the base wall part 41 and exposed to the inner space of the support 40. The second terminal parts 12b are arranged on the surfaces 11a of the projections 11 on the side opposite from the stem 4 and exposed to the space on the outside of the support 40 but inside of the package 2. The connection parts 12c, each connecting its corresponding first and second terminal parts 12a, 12b to each other, are embedded in the support 40. The connection parts 12c may be formed along a surface of the support 40.

The wiring 12 is provided in the base wall part 41, side wall parts 42, 43, and projections 11, which are integrally formed, so as to construct a molded interconnect device (MID). In this case, the base wall part 41, side wall parts 42, 43, and projections 11 are made of a molding material, examples of which include ceramics such as AlN and $Al_2O_3$, resins such as LCP, PPA, and epoxy, and glass for molding.

The terminals 34 of the light detection element 30 secured to the base wall part 41 are electrically connected to their corresponding first terminal parts 12a of the wiring 12. The corresponding terminal 34 of the light detection element 30 and first terminal part 12a of the wiring 12 are electrically connected to each other by wire bonding with a wire 8.

As illustrated in FIGS. 2 and 3, the lead pins 3 penetrating through the stem 4 are electrically connected to their corresponding second terminal parts 12b of the wiring 12. The lead pins 3 are inserted through their corresponding through holes 11c of the projections 11. Each second terminal part 12b surrounds its corresponding through hole 11c on the surface 11a of the projection 11. In this state, the corresponding lead pin 3 and second terminal part 12b of the wiring 12 are electrically connected to each other with a conductive resin, solder, or the like. Here, the lead pins 3 include those simply secured to the through holes 4b of the stem 4 and the through holes 11c of the projections 11 but not electrically connected to the wiring 12.

In thus constructed spectrometer 1A, as illustrated in FIG. 1, the light L1 enters the package 2 from the light entrance part 6 thereof and passes through the light transmission hole 46 of the base wall part 41 and the slit 33 of the light detection element 30 in sequence, thereby coming into the inner space of the support 40. The light L1 entering the inner space of the support 40 reaches the dispersive part 21 of the dispersive element 20 and is dispersed and reflected by the dispersive part 21. The light L2 dispersed and reflected by the dispersive part 21 reaches the light detection part 31 of the light detection element 30 and is detected by the light detection element 30. At this time, electric signals are inputted to and outputted from the light detection part 31 of the light detection element 30 through the terminals 34 of the light detection element 30, the wires 8, the wiring 12, and the lead pins 3.

A method for manufacturing the spectrometer 1A will now be explained. First, a molded interconnect device provided with the integrally formed base wall part 41, side wall parts 42, 43, and projections 11 with the wiring 12 is prepared. Subsequently, as illustrated in FIG. 4, the light detection element 30 is bonded to the inner surface 41a of the base wall part 41 of the support 40 with reference to alignment marks 47 provided on the inner surface 41a. Then, the corresponding terminal 34 of the light detection element 30 and first terminal part 12a of the wiring 12 are electrically connected to each other by wire bonding with the wires 8. Thereafter, the dispersive element 20 is bonded to the cutouts 44, 45 of the side wall parts 42, 43 with reference to alignment marks 48 provided at the end faces 42a of the side wall parts 42 of the support 40.

In thus manufactured optical unit 10A, the dispersive part 21 and the light detection part 31 are accurately positioned with respect to each other in the X- and Y-axis directions by mounting with reference to the alignment marks 47, 48. The dispersive part 21 and the light detection part 31 are also accurately positioned with respect to each other in the Z-axis direction by the difference in level between the bottom faces 44a, 45a of the cutouts 44, 45 and the inner surface 41a of the base wall part 41. Here, the slit 33 and the light detection part 31 are accurately positioned with respect to each other in the light detection device 30 during its manufacture. Therefore, the optical unit 10A becomes one in which the slit 33, dispersive part 21, and light detection part 31 are accurately positioned with respect to each other.

Next, as illustrated in FIGS. 2 and 3, the stem 4 having the lead pins 3 secured to the through holes 4b is prepared, and the optical unit 10A is bonded to the inner surface 4c of the stem 4 while inserting the lead pins 3 through the through holes 11c of the projections 11 of the optical unit 10A. Subsequently, the corresponding lead pin 3 and second terminal part 12b of the wiring 12 are electrically connected to each other with a conductive resin, solder, or the like. Then, as illustrated in FIGS. 1 and 2, the cap 5 provided with the light entrance part 6 is prepared, and the stem 4 and cap 5 are airtightly joined to each other. The foregoing manufactures the spectrometer 1A.

Effects produced by the spectrometer 1A will now be explained. First, in the spectrometer 1A, the second terminal parts 12b of the wiring 12 electrically connected to the light detection element 30 are arranged in the projections 11 projecting from the support 40 supporting the light detection element 30, and the electrical connection between the lead pins 30 and the wiring 12 is achieved in the projections 11. This secures the electrical connection between the lead pins 30 and the wiring 12. In addition, since the lead pins 3 penetrate through the stem 4, any external force acting on the lead pins 3 on the outside of the package 2 is less likely to extend over the electrical junctions between the lead pins 3 and wiring 12 in the projections 11. Further, the projections 11 projecting from the support 40 supporting the light detection element 30 are arranged at such positions as to be in contact with the stem 4. This enables the support 40 to be seated well with respect to the stem 4, which, in conjunction with the fact that the support 40 is secured onto the stem 4, improves the stability of the support 40 with respect to the stem 4, whereby the positional relationship between the dispersive part 21 of the dispersive element 20 and the light detection part 31 of the light detection element 30 is harder to go wrong. The foregoing makes it possible for the spectrometer 1A to secure the electrical connection between the light detection element 30 and external wirings and stabilize the positional relationship between the dispersive part 21 of the dispersive element 20 and the light detection part 31 of the light detection element 30 at the same time.

In the spectrometer 1A, a plurality of lead pins 3 are electrically connected to the second terminal parts 12b of the wiring 12 while being inserted through the through holes 11c of the projections 11. This can securely and easily achieve the electrical connection between the lead pins 3 and the second terminal parts 12b and the positioning of the optical unit 10A with respect to the package 2. At this time, the length by which the lead pins 3 project into the package 2 can be shortened, whereby defects such as bending of the lead pins 3 can be inhibited from occurring.

In the spectrometer 1A, the integrally formed base wall part 41, side wall parts 42, 43, and projections 11 are provided with the wiring 12, so as to construct a molded interconnect device. This enables the wiring 12 to be routed appropriately, while stabilizing the positional relationship among the base wall part 41, side wall parts 42, 43, and projections 11.

In the spectrometer 1A, the support 40 is a hollow structure including the base wall part 41, a pair of side wall parts 42, and a pair of side wall parts 43, while the projections 11 project from the respective side wall parts 43 to the side opposite from the dispersive part 21. This can simplify the structure of the support 40.

In the spectrometer 1A, the base wall part 41 of the support 40, which is a hollow structure, is formed with the light transmission hole 46 for transmitting therethrough the light L1 entering the package 2 from the light entrance part 6. This can inhibit unnecessary light from entering the dispersive part 21. In the spectrometer 1A, the light detection element 30 is arranged on the stem 4 side of the base wall part 41 of the support 40, which is a hollow structure. This can inhibit unnecessary light from entering the light detection part 31 of the light detection element 30. For preventing unnecessary light from advancing into the support 40 or restraining stray light from occurring in the support 40, the support 40 may be formed by a light-absorbing material, or a light-absorbing film may be formed on the outer or inner surface of the support 40 or the surface 22a of the substrate 22 of the dispersive element 20.

In the spectrometer 1A, the dispersive part 21 is disposed on the substrate 22, so as to construct the dispersive element 20. This can improve the degree of freedom in arranging the dispersive part 21 within the package 2.

In the spectrometer 1A, the dispersive element 20 is secured onto the stem 4. This can control the temperature of the dispersive part 21 by heat transfer through the stem 4. Hence, deformations (e.g., changes in grating pitch) of the dispersive part 21 caused by changes in temperature can be suppressed, so as to reduce wavelength shift and the like.

The spectrometer 1A is advantageous for making it smaller, since an optical path of the light L1 from the light entrance part 6 to the dispersive part 21 and an optical path of the light L2 from the dispersive part 21 to the light detection part 31 are formed in the space. The reason thereof will be explained while comparing a case where the optical paths for the light L1, L2 are formed in the space (hereinafter referred to as "case of spatial optical path") and a case where the optical paths for the light L1, L2 are formed in glass (hereinafter referred to as "case of glass optical path") with each other. The refractive index in glass is greater than that in a space. Therefore, when the entrance NA is the same, the spread angle of light in the case of glass optical path is greater than that in the case of spatial optical path. When the grating pitch of the dispersive part 21 is the same, the angle of diffraction of light in the case of glass optical path is smaller than that in the case of spatial optical path.

For making the spectrometer 1A smaller, it is necessary to reduce the distance between the light entrance part 6 and the dispersive part 21 and the distance between the dispersive part 21 and the light detection part 31. As the distance between the dispersive part 21 and the light detection part 31 is shorter, the convergence distance of the dispersive part 21 with respect to the light detection part 31 decreases, thereby making it necessary to reduce the radius of curvature of the dispersive part 21. When the radius of curvature of the dispersive part 21 becomes smaller, it is necessary to increase the angle of diffraction of light in the dispersive part 21 in connection with the angle by which wide light is incident on the dispersive part 21. When the distance between the light entrance part 6 and the dispersive part 21 is made shorter, it is also necessary to secure a sufficient area of light with which the dispersive part 21 is irradiated.

Here, when the entrance NA is the same, the spread angle of light in the case of glass optical path is smaller than that in the case of spatial optical path as mentioned above. When the grating pitch of the dispersive part 21 is the same, the angle of diffraction of light in the case of glass optical path becomes smaller than that in the case of spatial optical path. Therefore, the case of spatial optical path is advantageous over the case of glass optical path in order to reduce the size of the spectrometer 1A required to increase the angle of diffraction of light in the dispersive part 21 and secure a sufficient area of light with which the dispersive part 21 is irradiated.

Second Embodiment

Figure 5:
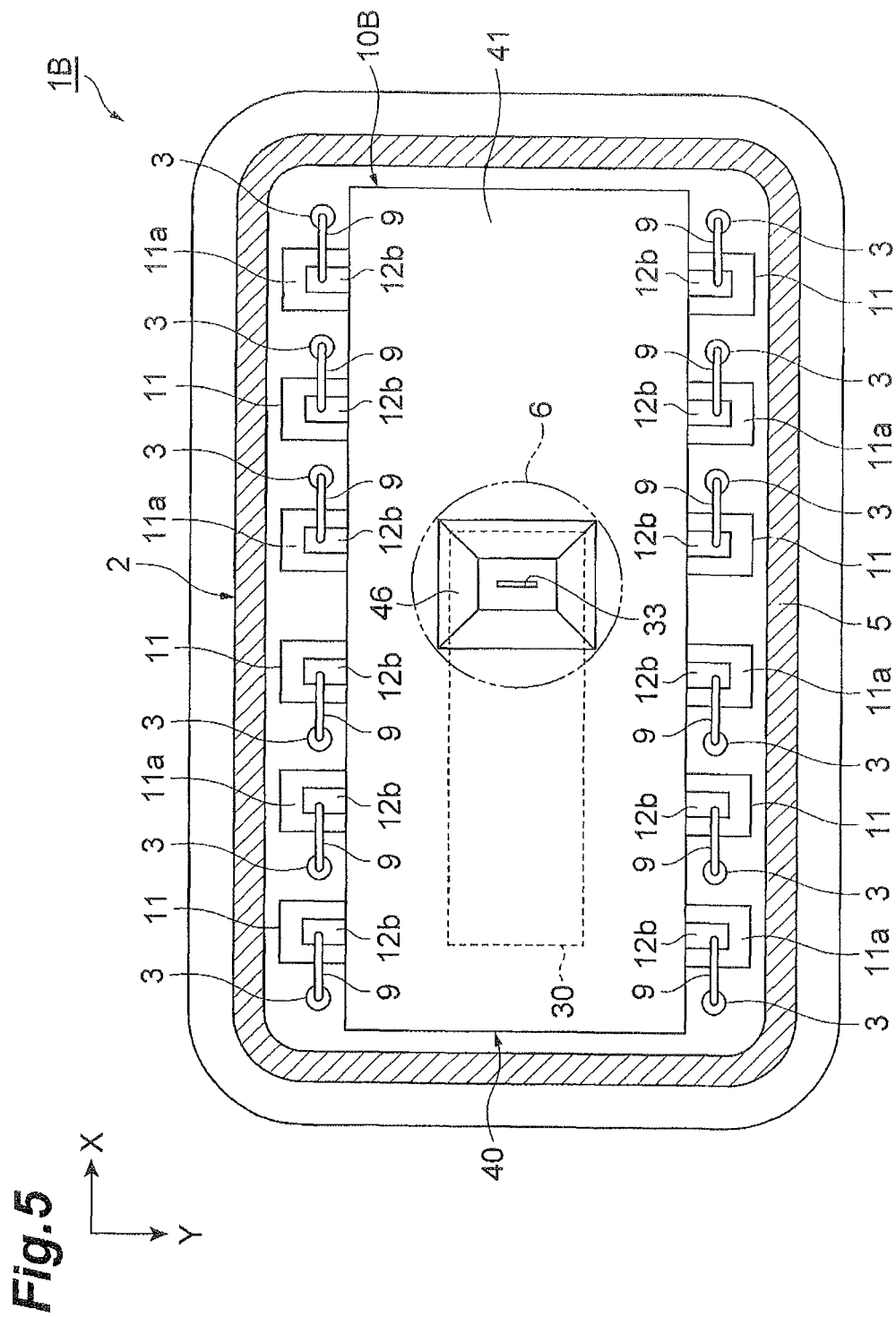
FIG. 5 is a sectional view of the spectrometer in accordance with a second embodiment seen as a plan view.

As illustrated in FIG. 5, a spectrometer 1B differs from the above-mentioned spectrometer 1A mainly in that the lead pins 3 are electrically connected to the second terminal parts 12b of the wiring 12 by wire bonding. In the optical unit 10B of the spectrometer 1B, a plurality of projections 11 are provided for the respective lead pins 3. In other words, the projections 11 are divided into a plurality of members corresponding to the respective lead pins 3. The second terminal parts 12b of the wiring 12 are arranged on the respective surfaces 11a of the projections 11 and exposed to the space on the outside of the support 40 but inside of the package 2.

Each lead pin 3 is juxtaposed with its corresponding projection 11 along the X-axis direction. At least a part of the lead pins 3 are arranged so as to pass between the projections 11 adjacent to each other. Thus, while being separated from the projections 11 juxtaposed therewith, the lead pins 3 are electrically connected to their corresponding second terminal parts 12b by wire bonding with wires 9, Thus constructed spectrometer 1B exhibits the following effects in addition to those in common with the above-mentioned spectrometer 1A. That is, since the projections 11 arranged with the second terminal parts 12b are placed at such positions as to be in contact with the stem 4, the spectrometer 1B can secure the electrical connection between the lead pins 3 and the second terminal parts 12b by wire bonding. That is, while the lead pins 3 projecting into the package 2 by a long length may vibrate in ultrasonic bonding, for example, so that ultrasonic waves are harder to act on junctions between the lead pins 3 and the wires 9, thereby making it difficult to perform wire bonding stably, the spectrometer 1B in which the projections 11 arranged with the second terminal parts 12b are placed at such positions as to be in contact with the stem 4 can prevent such a situation from occurring and stably perform wire bonding.

Since the lead pins 3 are arranged so as to pass between the projections 11 adjacent to each other, the spectrometer 1B can also be made smaller by effectively utilizing spaces. Since it is unnecessary to insert a plurality of lead pins 3 through a plurality of through holes 11c as in the above-mentioned spectrometer 1A, the optical unit 10B can easily be mounted on the stem 4. No special mounting devices are necessary, and errors such as bending of the lead pins 3 can be avoided, whereby the yield in manufacturing the spectrometer 1B improves.

Third Embodiment

Figure 6:
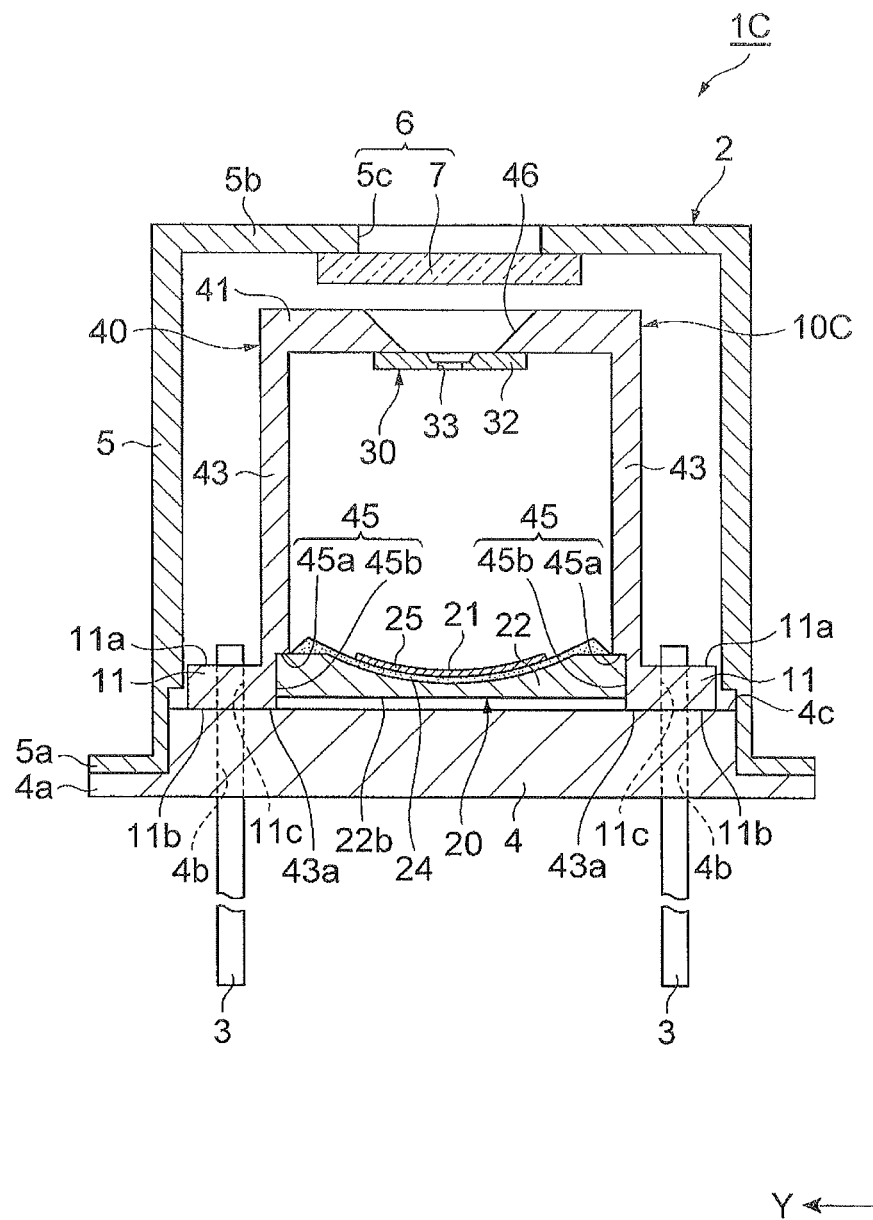
FIG. 6 is a sectional view of the spectrometer in accordance with a third embodiment seen as a side view.

As illustrated in FIG. 6, a spectrometer 1C differs from the above-mentioned spectrometer 1A mainly in that the dispersive element 20 is separated from the stem 4. In the optical unit 10C of the spectrometer 1C, while the dispersive element 20 is arranged in the cutouts 44, 45 of the side wall parts 42, 43, the surface 22b of the substrate 22 of the dispersive element 20 is located on the inner side (i.e., on the side opposite from the stem 4) of the support 40 having a hollow structure than are the end faces 42a of the side wall parts 42, end faces 43a of the side wall parts 43, and surfaces 11b of the projections 11 flush with each other. This forms a space between the inner surface 4c of the stem 4 and the surface 22b of the substrate 22 of the dispersive element 20.

Thus constructed spectrometer 1C exhibits the following effects in addition to those in common with the above-mentioned spectrometer 1A. That is, since the dispersive element 20 is supported by the support 40 while being separated from the stem 4, heat can be inhibited from affecting the dispersive part 21 through the stem 4 from the outside. Hence, deformations (e.g., changes in grating pitch) of the dispersive part 21 caused by changes in temperature can be suppressed, so as to reduce wavelength shift and the like. This configuration is effective when the temperature of the dispersive part 21 is not controlled by heat transfer through the stem 4 (as in the above-mentioned spectrometer 1A).

Fourth Embodiment

Figure 7:
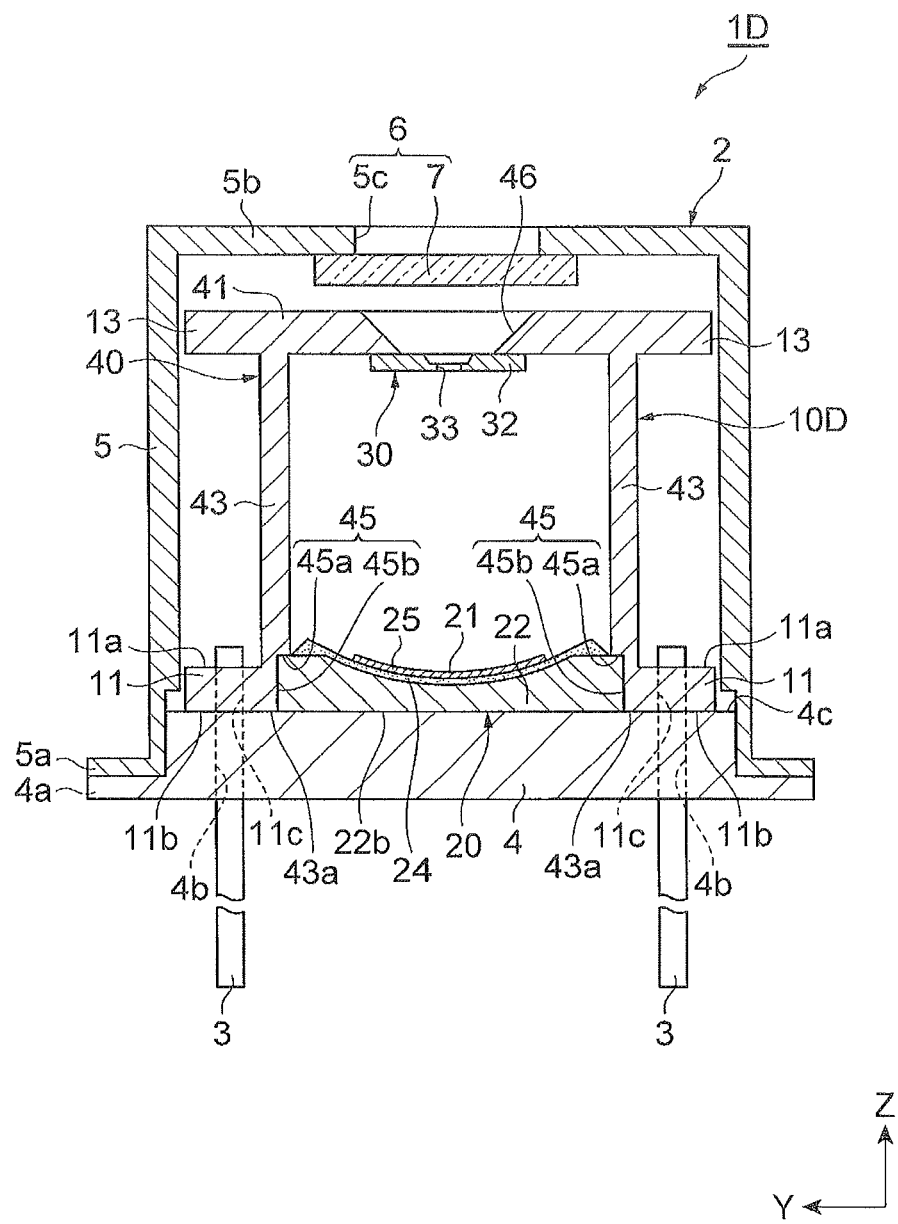
FIG. 7 is a sectional view of the spectrometer in accordance with a fourth embodiment seen as a side view.

As illustrated in FIG. 7, a spectrometer 1D differs from the above-mentioned spectrometer 1A mainly in that the support 40 is provided with opposing parts 13. In the optical unit 10D of the spectrometer 1D, the opposing parts 13 project from the respective end parts of the side wall parts 43 on the side opposite from the stem 4 to the side opposite from the dispersive part 21 (i.e., on the outside of the support 40 in the form of a hollow structure), while the opposing parts 13 extend in the X-axis direction along their corresponding end parts of the side wall parts 43. That is, the opposing parts 13 oppose the projections 11 on the side opposite from the stem 4. Each opposing part 13 may be arranged in a middle part of its corresponding side wall part 43 (a part between the end part on the stem 4 side and the end part on the side opposite from the stem 4).

Thus constructed spectrometer 1D exhibits the following effects in addition to those in common with the above-mentioned spectrometer 1A. That is, the opposing parts 13 can function as reinforcement members for the side wall parts 43, thereby improving the strength of the support 40 in the form of a hollow structure. The opposing parts 13 also block spaces between the respective side wall parts 43 and the cap 5 from the light transmission hole 46 of the base wall part 41, thereby inhibiting stray light from occurring due to reflections of light in these spaces and the like.

While the first to fourth embodiments of the present invention are explained in the foregoing, the present invention is not limited to the above-mentioned embodiments. For example, the lead pins 3 are not required to be electrically connected to the second terminal parts 12b of the wiring 12 while being inserted through the projections 11 as in the spectrometers 1A, 1C, 1D. By way of example, a depression may be formed in the projection 11 so as to open to the stem 4 side, and an end part of the lead pin 3 may be disposed to this depression. In this case, the second terminal part 12b may be exposed to the inner surface of the depression, and the lead pin 3 and the second terminal part 12b may electrically be connected to each other in the depression. Such a configuration can also securely and easily achieve the electrical connection between the lead pins 3 and the second terminal parts 12b and the positioning of the optical units 10A, 10C, 10D with respect to the package 2.

Figure 8:
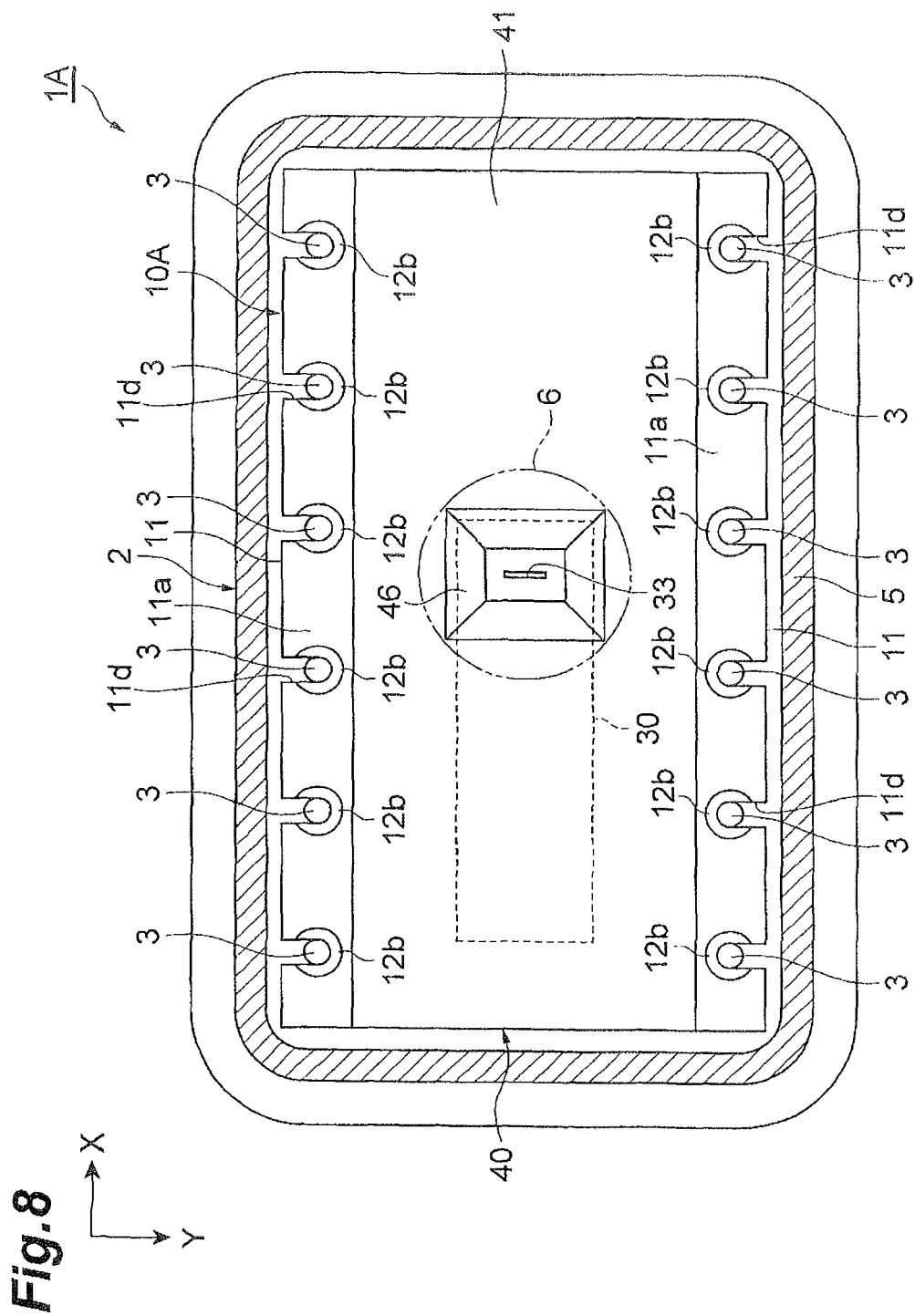
FIG. 8 is a sectional view of a modified example of the spectrometer of FIG. 1 seen as a plan view.

As illustrated in FIG. 8, a cutout 11d may be formed in the projection 11 so as to open to the outside (i.e., the side opposite from the support 40), and an end part of the lead pin 3 may be disposed to the cutout lid. In this case, the second terminal part 12b is arranged on the surface 11a of the projection 11 for each cutout 11d and exposed to the space on the outside of the support 40 but inside of the package 2. Then, the end part of the lead pin 3 disposed to each cutout 11d and the second terminal part 12b corresponding to the cutout 11d are electrically connected to each other with a conductive resin, solder, or the like. Such a configuration can also securely and easily achieve the electrical connection between the lead pins 3 and the second terminal parts 12b and the positioning of the optical unit 10A with respect to the package 2. In addition, it is unnecessary to insert a plurality of lead pins 3 through a plurality of through holes 11c, whereby the optical unit 10A can easily be mounted on the stem 4. No special mounting devices are necessary, and errors such as bending of the lead pins 3 can be avoided, whereby the yield in manufacturing the spectrometer 1A improves.

The projections are arranged at such positions as to be in contact with the stem in the spectrometer of the present invention and thus can be electrically connected to the second terminal parts while being fitted to the projections as in the spectrometer 1A or by wire bonding while being separated from the projections as in the spectrometer 1B. Hence, the spectrometer of the present invention can widen the assembly of the spectrometer concerning the electrical connection between the lead pins and wiring.

It is sufficient for the projections 11 to be provided in one of the side wall parts 42, 43 of the support 40. Providing the projections 11 over the side wall parts 42, 43 adjacent to each other can effectively inhibit the support 40 from warping. When performing wire bonding with the wires 8, 9, a part of the support 40, such as a part of the side wall parts 42, 43, may be cut out in order to prevent the support 40 from interfering with tools of the wire bonding device. The base wall part 41, side wall parts 42, 43, and projections 11 may be prepared separately from each other and assembled together.

The terminals 34 may be formed on the surface 32b of the substrate 32. In this case, flip-chip bonding with bumps made of Au, solder, or the like can electrically connect the terminals 34 and the first terminal parts 12a of the wiring 12 to each other and secure the light detection device 30 to the base wall part 41. Without forming the slit 33 in the substrate 32, the light detection device 30 may be secured to the base wall part 41 so as not to cover the light transmission hole 46 of the base wall part 41. In this case, a slit chip (e.g., one having a slit formed in a body made of silicon and one in which a light-absorbing film having a slit-shaped opening formed on a surface of a light-transmitting body) may be attached to the base wall part 41. Forming the base wall part 41 with a depression for disposing the slit chip thereto can accurately position the slit chip, the dispersive part 21 of the dispersive element 20, and the light detection part 31 of the light detection element 30 with respect to each other.

In the optical unit of the spectrometer of the present invention, the dispersive element provided with the dispersive part may be out of contact with the support. By way of example, the substrate 22 of the dispersive element 20 provided with the dispersive part 21 may be surrounded by the side wall parts 42, 43 of the support 40 with a gap therebetween.

A structure for cutting zero-order light generated in the dispersive part 21 (e.g., one which is made of a light-absorbing material and has a surface adapted to reflect incident zero-order light to the side opposite from the optical paths of the light L1, L2) may be arranged on the opposite side of the light detection part 31 from the light transmission hole 46. This structure may be formed integrally with the base wall part 41 or prepared separately and then secured to the base wall part 41. As in the foregoing, various materials and forms can be employed for the constituents of the spectrometers 1A to 1D without being restricted to those mentioned above.

INDUSTRIAL APPLICABILITY

The present invention can provide a spectrometer which can secure the electrical connection between the light detection element and the external wiring and stabilize the positional relationship between the dispersive part and the light detection element at the same time.

REFERENCE SIGNS LIST 1A, 1B, 1C, 1D: spectrometer; 2: package; 3: lead pin; 4: stem; 5: cap; 6: light entrance part; 10A, 10B, 10C, 10D: optical unit; 11: projection; 12: wiring; 12a: first terminal part; 12b: second terminal part; 13: opposing part; 20: dispersive element: 21: dispersive part; 22: substrate; 30: light detection element; 34: terminal; 40: support; 41: base wall part; 42, 43: side wall part; 44, 45: cutout; 46: light transmission hole (light transmission part); L1, L2: light.

The invention claimed is:

1. A spectrometer comprising:
a package having a stem and a cap provided with a light entrance part;
an optical unit arranged on the stem within the package; and
a lead pin penetrating through the stem;
wherein the optical unit has:
a dispersive part for dispersing and reflecting light entering the package from the light entrance part;
a light detection element for detecting the light dispersed and reflected by the dispersive part;
a support for supporting the light detection element such as to form a space between the dispersive part and the light detection element;
a projection projecting from the support; and
a wiring including a first terminal part electrically connected to a terminal of the light detection element and a second terminal part arranged in the projection;
wherein the projection is arranged at such a position as to be in contact with the stem; and
wherein the lead pin is electrically connected to the second terminal part.

2. A spectrometer according to claim 1, wherein the lead pin is electrically connected to the second terminal part while being disposed to the projection.

3. A spectrometer according to claim 2, wherein the lead pin is electrically connected to the second terminal part while being inserted through to the projection.

4. A spectrometer according to claim 1, wherein the lead pin is electrically be connected to the second terminal part by wire bonding while being separated from the projection.

5. A spectrometer according to claim 4, wherein a plurality of such lead pins are provided;
wherein a plurality of such projections are provided so as to correspond to the respective lead pins; and
wherein the lead pins are arranged so as to pass through the projections adjacent to each other.

6. A spectrometer according to claim 1, wherein the support is secured onto the stem.

7. A spectrometer according to claim 1, wherein the support is provided with the wiring.

8. A spectrometer according to claim 1, wherein the support includes:
a base wall part, arranged so as to oppose the stem, having the light detection element secured thereto; and
a side wall part, arranged so as to erect from a side of the dispersive part to the stem, for supporting the base wall part; and
wherein the projection projects from the side wall part to the side opposite from the dispersive part.

9. A spectrometer according to claim 8, wherein the base wall part is provided with a light transmission part for transmitting therethrough the light entering the package from the light entrance part.

10. A spectrometer according to claim 8, wherein the light detection element is arranged on the stem side of the base wall part.

11. A spectrometer according to claim 8, wherein the base wall part, side wall part, and projection are formed integrally.

12. A spectrometer according to claim 1, wherein the dispersive part constitutes a dispersive element by being provided on a substrate.

13. A spectrometer according to claim 12, wherein the dispersive element is secured onto the stem.

14. A spectrometer according to claim 12, wherein the dispersive element is supported by the support while being separated from the stem.

15. A spectrometer according to claim 12, wherein the support is formed with a cutout for disposing a part of the dispersive element thereto.

16. A spectrometer according to claim 1, wherein the optical unit further has an opposing part opposing the projection on the side opposite from the stem.

17. A spectrometer according to claim 1, wherein the support includes a side wall part arranged so as to erect from a side of the dispersive part to the stem.

* * * * *